F. M. WALLER.
MECHANICALLY PROPELLED PLOW.
APPLICATION FILED JUNE 29, 1914.
1,106,603.
Patented Aug. 11, 1914.
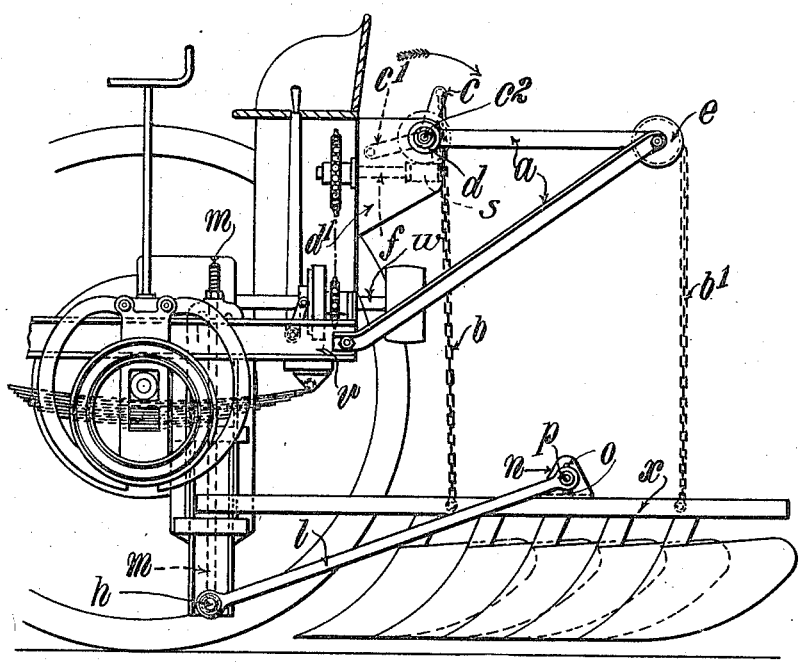
WITNESSES
H. E. Bready.
M. M. Border
INVENTOR
F. M. Waller.
per Percy H. Moor
Attorney

UNITED STATES PATENT OFFICE.

FRANCIS MARK WALLER, OF WEMBLEY, ENGLAND.

MECHANICALLY-PROPELLED PLOW.

1,106,603. Specification of Letters Patent. Patented Aug. 11, 1914.

Application filed June 29, 1914. Serial No. 847,986.

*To all whom it may concern:*

Be it known that I, FRANCIS MARK WALLER, a subject of the King of Great Britain and Ireland, residing at High Road, Wembley, Middlesex, England, have invented certain new and useful Improvements in Mechanically-Propelled Plows, of which the following is a specification.

This invention relates to mechanically propelled plows of the type in which a series of plows are mounted in echelon on a frame which is carried by and attached to the tractor at its rear end, and it consists of an improved means for raising and lowering the frame carrying said plows whereby in raising it the front plow is lifted in advance of those in the rear and in lowering it the front plow is lowered in advance of those in the rear, the object being to enable each plow to enter and leave the ground at approximately the same point at each headland.

A further object of this invention is to obtain lifting mechanism that cannot be overwound and requires no reverse.

In the accompanying drawing which illustrates this invention the figure is a broken view in side elevation.

According to the present invention, the frame $x$ carrying the plows is suspended from a jib $a$ carried by the rear part of the frame $v$ of the tractor by means of two connections $b$ and $b^1$, one of which $b$ is attached to the front of the frame $x$ and the other of which $b^1$ is attached to the rear part of said frame. Mounted in bearings $d$ carried by a bracket $d^1$, which can conveniently carry the top member of the jib, is a crank-shaft $c^2$ having two cranks $c$ and $c^1$ which are set at an angle of 130 degrees or thereabout to one another. These two cranks are connected to the frame $x$ carrying the plows by means of the two connections $b$ and $b^1$ which may conveniently be chains. The forward chain $b$ runs from the crank $c$ directly to its point of attachment to the front part of the frame $x$ and the rear chain $b^1$ runs from the crank $c^1$ to its point of attachment to the rear part of the frame $x$ over a guide such as the pulley $e$ carried by the end of the jib $a$, said guide being located at such a distance to the rear of the crank-shaft $c^2$ that the frame $x$ will have no appreciable longitudinal movement with respect to the tractor when it is being lifted.

The angle at which the two cranks $c$ and $c^1$ are set to one another is such and the connections between said cranks and the frame carrying the plows are so arranged that in either raising or lowering said frame the front end thereof moves in advance of the rear end whereby the front plow is both raised and lowered in advance of the plow or plows to the rear of it, which enables the furrow made by each plow to be started and finished in line with the respective headlands.

The lengths of the cranks $c$ and $c^1$ are such that the plow is completely raised or lowered by half a revolution of the crank-shaft, that is to say one half revolution performs the one function and the other half revolution the other function, thereby dispensing with the necessity of any provision for reversing the direction of rotation of the crank-shaft, and, further, as the lift of the plow is limited to the throw of the cranks no damage can result from over-rotation of the crank-shaft.

The crank-shaft $c^2$ is driven from the motor of the tractor through any suitable gearing and is put in and out of action by the operation of a clutch or the like. A convenient arrangement is that shown in the accompanying drawing which consists of a lay shaft $f$ driven from the main shaft $w$ of the motor through chain gearing and of worm gearing $s$ for communicating the motion to the crank-shaft $c^2$ from the lay shaft $f$.

The draft of the plow is taken from a transversely arranged drawbar $h$ which is adjustable vertically at each end in relation to the frame $v$ of the tractor by means of adjusting rods $m$, and the plow is connected to this drawbar by means of links $l$ which are connected to plates $n$ carried by the frame $x$, said plates being provided with a series of holes $o$ through which the connecting pins $p$ of said links can be passed.

What I claim as my invention and desire to secure by Letters Patent is:—

1. In mechanically propelled plows, the combination with a frame carrying a series of plows arranged in echelon, of tackle for raising and lowering said frame comprising a crank-shaft having two cranks set at an angle of 130 degrees to one another, means for rotating said crank-shaft, a connection coupling one of the cranks directly with the forward part of the frame carrying the plows, and a connection coupling the other crank with the rear part of the frame carrying the plows said connection being carried over a guide located to the rear of the crank-shaft.

2. In mechanically propelled plows the combination of a tractor; a frame carrying a series of plows arranged in echelon; a jib fixed to the tractor and adapted to carry the plow frame; links for coupling said frame to the tractor; and tackle for raising and lowering said frame comprising a crank-shaft having two cranks set at an angle of approximately 130 degrees, means for driving said crank-shaft from the tractor, a connection coupling one of the cranks of said crank-shaft directly to the forward part of the frame carrying the plows, and a connection coupling the other crank to the rear part of the frame carrying the plows said connection being carried over a guide located to the rear of the crank-shaft.

3. In mechanically propelled plows the combination of a tractor; a frame carrying a series of plows arranged in echelon; a jib fixed to the tractor from which the plow frame is suspended; a drawbar carried by the tractor; links for coupling the plow frame to said drawbar; means for varying the points of attachment of said links to said plow frame; and tackle for raising and lowering said frame comprising a crank-shaft having two cranks set at an angle of 130 degrees, gearing for driving said crank-shaft from the motor of the tractor, a connection coupling one of the cranks to the forward part of the frame carrying the plows, and a flexible connection coupling the other crank to the rear part of the frame carrying the plows said flexible connection being carried over a pulley carried by the jib at a point to the rear of the crank-shaft.

In testimony whereof I have signed my name in the presence of two subscribing witnesses.

FRANCIS MARK WALLER.

Witnesses:
 GEORGE DERHAM,
 HOWARD KRIKORIAN.